United States Patent [19]
Kohlen et al.

[11] Patent Number: 5,289,910
[45] Date of Patent: Mar. 1, 1994

[54] TRANSPORT APPARATUS

[75] Inventors: Helmut Kohlen, Erkelenz; Paul Surkanp, Kempen; Helmuth Hensen, Monchen-Gladbach, all of Fed. Rep. of Germany

[73] Assignee: W. Schlafhorst AG & Co., Monchen-Gladbach, Fed. Rep. of Germany

[21] Appl. No.: 948,112

[22] Filed: Sep. 21, 1992

[30] Foreign Application Priority Data

Sep. 21, 1991 [DE] Fed. Rep. of Germany ....... 4131518

[51] Int. Cl.⁵ ............................................. B65G 47/46
[52] U.S. Cl. .................. 198/371; 198/465.1; 198/633; 198/772; 242/35.5 A
[58] Field of Search .................. 198/371, 465.1, 465.2, 198/577, 633, 772; 242/35.5 A; 57/281

[56] References Cited

U.S. PATENT DOCUMENTS

| | | | |
|---|---|---|---|
| 2,820,542 | 1/1958 | Oswald | 198/772 |
| 4,544,107 | 10/1985 | Matsui et al. | |
| 5,056,725 | 10/1991 | Wirtz et al. | 242/35.5 A |
| 5,078,329 | 1/1992 | Grecksch et al. | 242/35.5 A |
| 5,179,829 | 1/1993 | Grecksch et al. | 57/281 |
| 5,190,136 | 3/1993 | Grecksch et al. | 198/465.1 |

FOREIGN PATENT DOCUMENTS

| | | |
|---|---|---|
| 0402703 | 12/1990 | European Pat. Off. |
| 3308172A1 | 9/1983 | Fed. Rep. of Germany |
| 4008990A1 | 12/1990 | Fed. Rep. of Germany |
| 4006467A1 | 9/1992 | Fed. Rep. of Germany |
| 63-145436 | 6/1988 | Japan |
| 2-251621 | 10/1990 | Japan |

Primary Examiner—Joseph E. Valenza
Attorney, Agent, or Firm—Shefte, Pinckney & Sawyer

[57] ABSTRACT

A textile machine transport apparatus is provided for transporting tube support members to and between locations at which yarn packages supported on the tube support members are handled. The transport apparatus includes an assembly for advancing the tube support members along a delivery path. The advancing assembly is reversibly drivable in a forward direction and in a reverse direction opposite to the forward direction to provide the capability to, for example, reverse the advancing movement of some of the tube support members or to advance other tube support members in a different advancing direction. The transport apparatus also includes a device extending laterally relative to the delivery path of the tube support members for engaging a tube support member to prevent further upstream movement thereof. The laterally extending device may be in the form of a stop guide extending into the path of the tube support members as they are transported in an upstream direction. The stop guide may be movably mounted to permit a tube support member passing thereby to move the stop guide into a retracted position and preferably includes a spring or other resilient biasing device for automatically returning the stop guide to a laterally extending position.

11 Claims, 3 Drawing Sheets

TRANSPORT APPARATUS

BACKGROUND OF THE INVENTION

The present invention relates to a textile machine transport apparatus for transporting tube support members of the type on which yarn packages are individually supported and, more particularly, to a textile machine transport apparatus which advances tube support members in an advancing direction by movement of a reversibly drivable advancing means and which selectively limits the rearward or non-advancing movement of the tube support members during reverse driving movement of the advancing means.

Textile machine transport apparatus are known for transporting tube support members in a controlled manner to and from locations at which yarn packages supported on the tube support members are handled such as, for example, the winding stations of a textile winding machine. Since each tube support member individually supports a yarn package thereon, controlled transport of each tube support member allows for individualized handling of each yarn package. For example, in a transport apparatus for transporting tube support members to and from the winding stations of the textile winding machine, it is desirable in some circumstances to separately handle those yarn packages having a yarn end which has been disposed in a preferred preliminary position for subsequent engagement at a winding station from other yarn packages which do not have such a successfully prepared yarn end. Those other yarn packages whose yarn ends are not yet disposed in a preferred preliminary position may be transported to a special handling location such as, for example, a device which mechanically works a portion of the yarn package, to facilitate loosening and preparation of the yarn end into a preferred preliminary position. Toward this end of individualized transport options for tube support members, U.S. Pat. No. 5,056,725 to Wirtz et al discloses a yarn package handling assembly with the capability to separate those yarn packages still not having a successfully prepared yarn end from other yarn packages having successfully prepared yarn ends. This capacity is provided by a system of sensors and gates operatively connected to the sensors with the gates being selectively movable into the path of transported tube support members to route such tube support members to a different transport route than other tube support members. However, the need still exists for improvements in textile machine transport apparatus having the capacity to transport tube support members in an individualized manner without significantly sacrificing efficient and accurate transport of such tube support members.

SUMMARY OF THE INVENTION

Briefly described, the present invention provides a textile machine transport apparatus for transporting tube support members of the type on which yarn packages are supported. The transport apparatus includes means for advancing tube support members, the advancing means being drivable in a forward direction to advance tube support members in a downstream direction along a delivery path and reversibly drivable in a reverse direction substantially opposite to the forward directions. Also, the transport apparatus includes means extending laterally relative to the delivery path for engaging a tube support member to prevent upstream movement of the engaged tube support member along the delivery path.

According to one aspect of the present invention, the laterally extending means extends from one lateral side of the delivery path toward the other lateral side of the delivery path and the transport apparatus further includes means for guiding tube support members during downstream movement thereof along the delivery path toward the one lateral side of the delivery path to position the tube support member sufficiently toward the one lateral side of the delivery path to ensure movement of the tube support member into engagement with the laterally extending means upon subsequent driving movement of the advancing means in the reverse direction. According to one feature of the one aspect of the present invention, the guiding means may include a guide contour extending in the downstream direction at an angle from the other lateral side of the delivery path toward the one lateral side of the delivery path.

According to another aspect of the present invention, the transport apparatus includes an inlet feed means for supplying tube support members to the advancing means, a first outlet means to which the advancing means advances tube support members through driving movement of the advancing means in the forward direction, and a second outlet means to which the advancing means advances tube support members through driving movement of the advancing means in the reverse direction. Also, the laterally extending means includes a first portion for engaging a tube support member to prevent upstream movement of the engaged tube support member away from the first outlet means during movement of the advancing means in the reverse direction and a second portion for engaging a tube support member to prevent upstream movement of the engaged tube support member away from the second outlet means during movement of the advancing means in the forward direction. Preferably, the first and second portions of the laterally extending means each include a guide contour extending in the path of the respective tube support member being advanced at an angle from one lateral side of the path toward another lateral side of the path for positioning a tube support member sufficiently toward the other lateral side of the delivery path to insure movement of the tube support member into engagement with the respective portion upon subsequent driving movement of the advancing means in a direction which effects upstream movement of the engaged tube support member.

According to a further feature of the another aspect of the present invention, each tube support member comprises an annular based component, a collar component coaxially mounted on the base component, and a post component onto which a yarn package is inserted and each of the first and second portions of the laterally extending means is disposed for engaging the collar component of a tube support member.

According to a further aspect of the present invention, the laterally extending means includes a contact member, means for movably supporting the contact member for movement between an extending position in which the contact member extends at an angle across the delivery path for intercepting a tube support member and a retracted position in which the contact member permits passage therepast of a tube support member and means for resiliently biasing the contact member into its extending position.

DESCRIPTION OF THE PREFERRED EMBODIMENT

Figure 1:
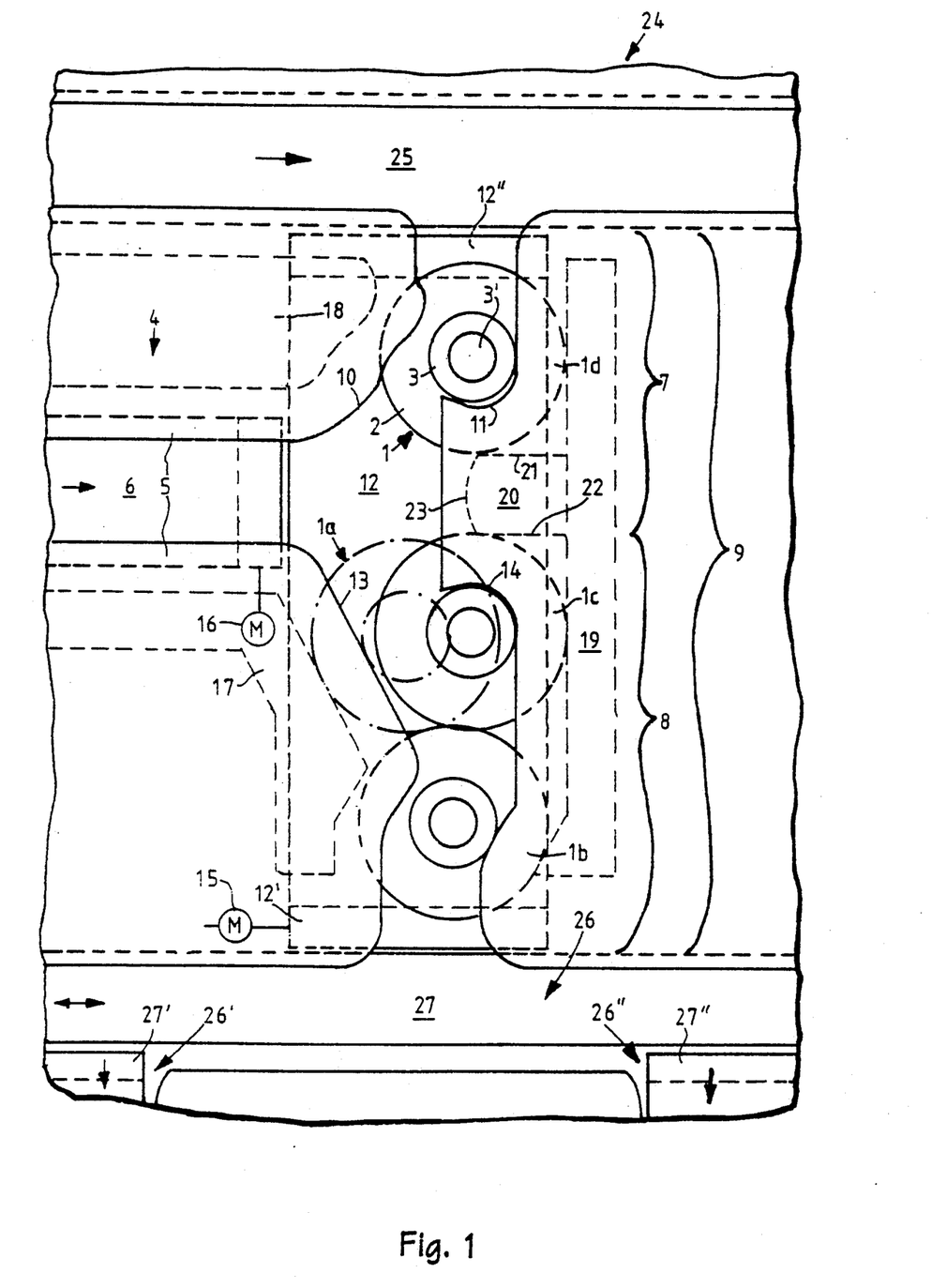
FIG. 1 is a top plan view of one embodiment of the transport apparatus of the present invention particularly adapted for selectively transporting individual tube support members to one of a pair of separate transport assemblies.

In FIG. 1, one embodiment of the transport apparatus of the present invention is illustrated. The transport apparatus is operable to transport a plurality of tube support members 1 of the type which support tubes on which yarn is wound to form yarn packages. Each individual tube support member 1 includes a cylindrical base component 2, a cylindrical collar component 3 coaxially mounted on the base component 2, and a cylindrical post component 3' coaxially mounted on the collar component 3. The diameter of the post component 3' is slightly smaller than the inside diameter of a tube while the diameter of the collar component 3 is larger than the outside diameter of a tube such that a tube inserted on a post component 3' is supported on the collar component 3 of the respective tube support member 1.

The embodiment of the transport apparatus illustrated in FIG. 1 is particularly adapted for selectively distributing tube support members 1 to a first outlet means in the form of a supply belt 27 for supply of the tube support members 1 to the winding stations (not shown) of a textile winding machine or to a second outlet means in the form of a bypass belt 25 for transporting the tube support member 1 in a bypass route 24 which bypasses the winding stations of the textile winding machine. The transport apparatus transports each tube support member 1 to a respective one of the belts 25,27 in response to a determination that a yarn package supported on the respective tube support member 1 is in condition for supply to a winding station of the textile winding machine or, alternatively, is not in condition for supply to a winding station and, therefore, should be routed along the bypass route to a further handling area. The determination that a yarn package on a tube support member 1 is suitable or not suitable for supply to a winding machine occurs at a conventional yarn end preparation assembly (not shown) from which the tube support members 1 are transported to the transport assembly along an inlet feed path 4.

The conventional yarn end preparation assembly includes a device for disposing a yarn end of a yarn package in a predetermined position for subsequent engagement of the yarn end at a winding station and a device for detecting whether a yarn end has been successfully disposed in the predetermined position. The inlet feed path 4 is formed by an endless belt 6 trained around a conventional guide roller (not shown) and a drive roller operatively connected to a drive motor 16 for driving operation of the belt 6 in the direction indicated by the arrow in FIG. 1.

An example of a conventional yarn end preparation assembly for preparing yarn packages supported on tube support members 1 for supply to the winding stations of a winding machine is disclosed in U.S. Pat. No. 5,056,725 to Wirtz et al, which is expressly incorporated by reference herein.

A pair of opposed guide contours 5 each extend laterally inwardly of the belt 6 for engaging the collar components 3 of the tube support members 1 during their transport by the belt 6 to thereby maintain the tube support members 1 laterally centrally on the belt 6 during their advancing movement.

The inlet feed path 4 transports the tube support members 1 from the conventional yarn end preparation assembly to a distribution belt 12 of the transport apparatus of the present invention. The distribution belt 12 extends transversely to the belt 6 adjacent the downstream end thereof and the distribution belt 12 is trained around a guide roller 12" and a drive roller 12', which is operatively connected to a drive motor 15 for driving operation of the distribution belt 12. One end of the distribution belt 12 extends adjacent the supply belt 27 and the other end of the distribution belt 12 extends adjacent the bypass belt 25. The distribution belt 12 is drivable in a forward supply direction to advance a tube support member 1 along a delivery path extending to the supply belt 27 for delivering the tube support member to, and transferring the tube support member onto, the supply belt 27. Also, the distribution belt 12 is drivable in a reverse or forward bypass direction opposite to the forward supply direction to advance a tube support member 1 along a bypass delivery path extending to the bypass belt 25 for delivering the tube support member to, and transferring the tube support member onto, the bypass belt 25. The reversible driving operation of the distribution belt 12 is controlled by controlled actuation of the drive motor 15 in a forward and reverse direction.

The supply belt 27 supplies those tube support members 1 distributed to it by the distribution belt 12 to the winding stations of the winding machine via a plurality of station feed paths 26',26" each respectively extending through an individual winding station of the textile machine and comprising a station feed belt 27',27", respectively, whose upstream end is disposed adjacent the supply belt 27 for drawing off tube support members supported on the supply belt 27 into the respective station feed path. The supply belt 27 is trained around a conventional guide roller and a conventional drive roller (not shown) and is reversibly drivable to supply tube support members I from the distribution belt to the station feed path 26',26".

The embodiment of the transport assembly illustrated in FIG. 1 includes means extending laterally relative to the delivery paths of the tube support members for engaging a tube support member to prevent upstream movement of the engaged tube support member along the respective delivery path. The laterally extending means is in the form of a pair of stop guides 11, 14, each of which extends from a lateral side of the distribution belt 12—in the embodiment illustrated in FIG. 1, both stop guides 11,14 extend from the same respective lateral side of the distribution belt 12. Each of the stop guides 11,14 is formed on a guide plate 9 which extends between the bypass belt 25 and the supply belt 27 and includes a bypass guide portion 7 and a supply portion 8. The bypass portion 7 of the guide plate 9 forms, in addition to the bypass stop guide 11, a guide contour extending from the bypass stop guide 11 to another guide contour extending parallel to the direction of the bypass belt 25 along one lateral side thereof. The supply portion 8 of the guide plate 9 forms, in addition to the supply stop guide 14, a guide contour extending from the supply stop guide 14 to a guide contour extending parallel to the supply belt 27 along a lateral side thereof.

The bypass stop guide 11, the supply stop guide 14, and the respective guide contours extending therefrom are disposed in the same plane generally at the height of the collar components 3 of the tube support members 1 for guiding engagement of these collar components by the guide contours. As seen in the broken lines in FIG. 1, the guide plate 9 additionally includes a lower guide component 19 for guiding engagement of the base components 2 of the tube support members 1. The lower guide component 19 includes a projection 20 extending laterally inwardly of the distribution belt 12 and having an arcuate contour 23 positioned convexly with respect to the inlet feed path 4. The guide control 23 engages the base components 2 of the tube support members 1 to facilitate the guided movement of the tube support members along the respective bypass delivery path or supply delivery path. The balance of the lower guide component 19 extends parallel to the distribution belt 12 laterally outwardly of the guide contours coplanar with the bypass stop guide 11 and the supply stop guide 14 and, additionally, laterally outwardly of the distribution belt 12. A complementary bypass guide plate 18 includes a guide contour 10 extending from one of the guide contours 5 of the inlet feed path 4 to a guide profile extending laterally along one side of the supply belt 25. The guide contour 10 extends from the inlet lateral side of the distribution belt 12 toward its other lateral side in the bypass delivery direction for engaging the collar component 3 of a tube support member 1 to guide the tube support member during advancement thereof in the bypass delivery direction. The guide contour 10 guides tube support members sufficiently toward the respective lateral side of the distribution belt 12 from which the bypass stop guide 11 extends to so position the tube support members that movement of the tube support members into engagement with the bypass stop guide 11 is assured upon driving movement of the distribution belt 12 in the supply delivery direction—e.g., in a direction which tends to move those tube support members 1 downstream of the bypass stop guide 11 in an upstream direction relative to the bypass delivery direction.

A complementary supply guide plate 13 includes a contour extending from the other guide contour 5 of the inlet feed path 4 to a guide contour extending along one lateral side of the supply belt 27. The complementary supply guide plate 13 includes a contour extending at an angle relative to the direction of travel of the distribution belt 12 in the supply delivery direction for engaging the collar component of a tube support member 1 being advanced in the supply delivery direction to guide the tube support member to a position downstream of the supply stop guide 14 at which the tube support member will be guided into contact with the supply stop guide 14 in the event that the distribution belt 12 is driven in the bypass delivery direction—e.g., in a direction opposite to the supply delivery direction such that the guided tube support member is moved upstream relative to the supply delivery direction.

The complementary bypass guide plate 18 and the complementary supply guide plate 13 each include a lower guide component 17 for engaging the base component 2 of the tube support members guided by the respective guide plate.

The operation of the embodiment of the transport apparatus illustrated in FIG. 1 is as follows. The tube support members 1 are advanced by the belt 6 through the yarn end preparation assembly for preparation of the yarn ends of the yarn packages supported on the tube support members. The detection device for detecting a successfully prepared yarn end, which is preferably the last device of the yarn end preparation assembly, is operatively connected to a control unit (not shown) which controls the operation of the drive motors 15,16. As each tube support member approaches the downstream end of the belt 6 for transfer to the distribution belt 12, the control unit controls the drive motor 15 to drive the distribution belt 12 either in the supply delivery direction or the bypass delivery direction in response to the detection result. If the yarn package supported on the respective tube support member 1 is detected as having a yarn end which has been successfully disposed in the predetermined position for subsequent engagement at a winding station, the drive motor 15 is controlled to drive the distribution belt 12 in the supply delivery direction, whereby the respective tube support member 1 is drawn off of the downstream end of the belt 6 by the distribution belt 12 and advanced toward the supply belt 27 with its collar component in guiding engagement with the guide contour of the complementary supply guide plate 13, as is illustrated by broken line schematic representation 1a in FIG. 1.

The guide contour of the complementary supply guide plate 13 guides the respective tube support member 1 laterally toward the guide plate 9 as the distribution belt advances the tube support member toward the supply belt 27 and the tube support member reaches the position illustrated by the broken lines 1b in FIG. 1 adjacent an end of the distribution belt 12 in position for subsequent transfer to the supply belt 27. During this guided movement, the lower guide component 17 of the complementary supply guide plate 13 engages the base component 2 of the tube support member to supplement the guided movement of the tube support member. If no subsequently following tube support member has been advanced by the belt 6 to the distribution belt 12, the continued driving movement of the distribution belt 12 in the supply delivery direction effects movement of the respective tube support member 1 onto the supply belt 27, which subsequently feeds the tube support member to one of the station feed paths 26',26". However, if a subsequently following tube support member is approaching the downstream end of the belt 6 before the tube support member in the position 1b has been transferred to the supply belt 27 and, further, if the detection device of the yarn end preparation assembly has not detected a successfully prepared yarn end on the yarn package supported on the subsequently following tube support member, the drive motor 15 is controlled to reversibly drive the distribution belt 12 in the bypass delivery direction.

Accordingly, when the subsequently following tube support member having the unsuccessfully prepared yarn package thereon reaches the downstream end of the belt 6, the distribution belt 12 draws the tube support member thereon and advances the tube support member in the bypass delivery direction toward the bypass belt 25. The collar component 3 of the tube support member is engaged by the guide profile 10 of the complementary bypass guide plate 18 and guided laterally across the distribution belt 12 toward the guide plate 9 as the distribution belt 12 advances the tube support member toward the bypass belt 25. The tube support member is subsequently drawn from the distribution belt 12 onto the bypass belt 25 and transported along the bypass route 24 to a further handling location such as, for example, a storage location at which unsuccessfully prepared yarn packages are stored until an operator can manually prepare the yarn ends of the packages. During this movement of the subsequently following tube support ember, the preceding tube support member is moved in an upstream direction away from the supply belt 27 and is engaged by the supply stop guide 14.

However, if the tube support member being advanced in the bypass delivery direction has not been completely advanced to the bypass belt 25 at the time at which the detection device of the yarn end preparation assembly has detected that the yarn end of the yarn package supported on the next following tube support member has been successfully prepared, the drive motor 15 is controlled to reverse the driving movement of the distribution belt 12 from the bypass delivery direction to the supply delivery direction. In this event, the tube support member which had been advanced downstream in the bypass delivery direction toward the bypass belt 25 is transported in an upstream direction away from the bypass belt 25 and is engaged by the bypass stop guide 11 which prevents further upstream movement of the tube support member during continued movements of the distribution belt 12 in the supply delivery direction. The next following tube support member is advanced by the distribution belt 12 in the supply delivery direction toward the supply belt 27.

In addition to the upstream blocking action of the supply stop guide 14 and the bypass stop guide 11, the projection 21 of the lower guide component 19 provides a supplemental upstream blocking action by engaging the base component 2 of the respective tube support member 1 being blocked from further upstream movement. As a result of the upstream blocking action of the respective stop guides on the guide plate 9 and the projection 21 on the lower guide component 19, the blocked tube support members are prevented from further upstream movement which would otherwise result in the tube support members being transported increasingly farther from the respective one of the bypass belt 25 or the supply belt 27 to which they are ultimately to be transferred.

Figure 2:
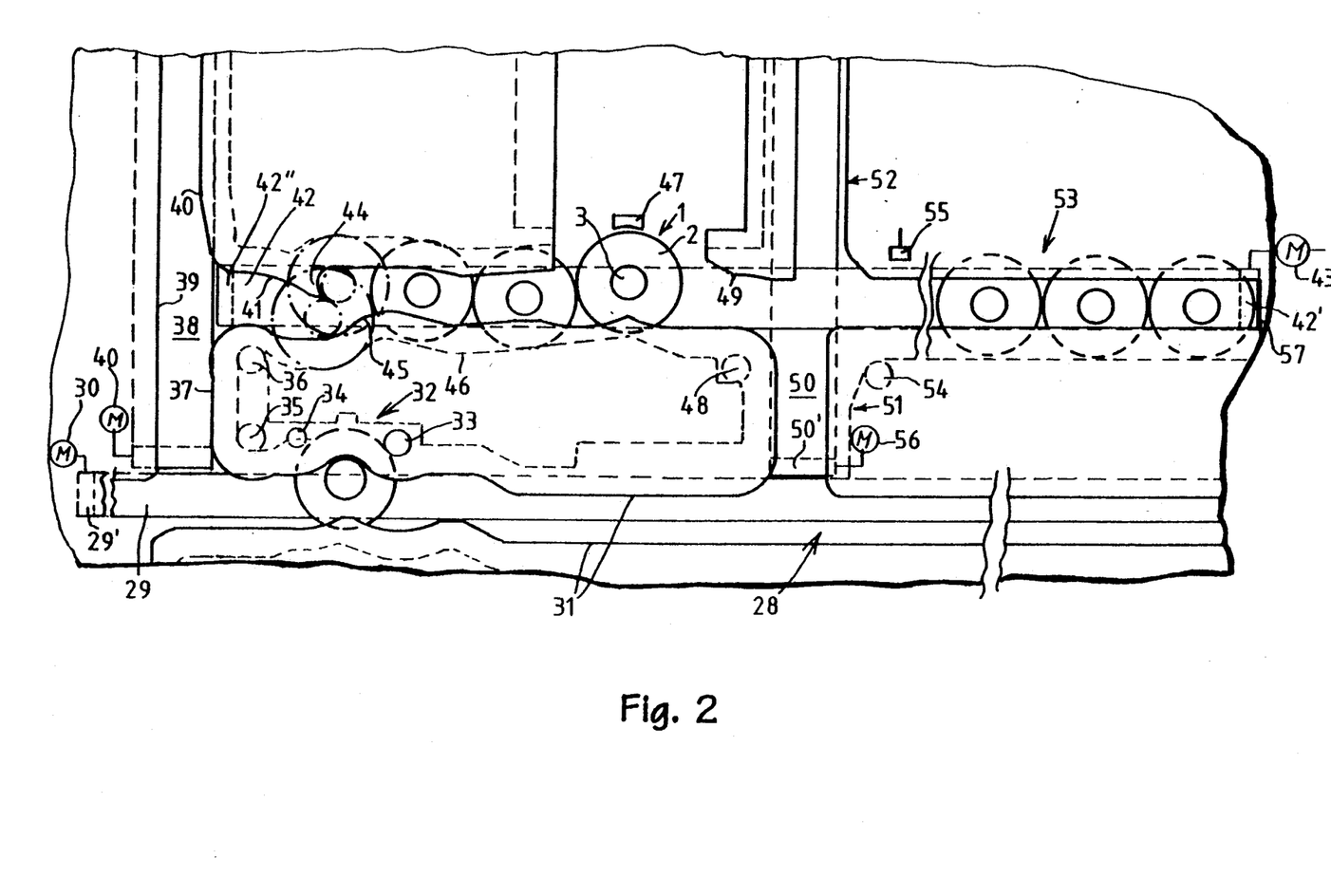
FIG. 2 is a top plan view of another embodiment of the transport apparatus of the present invention particularly adapted for transporting individual tube support members to and between a tube stripping device and a reserve segment.

In FIG. 2, another embodiment of the transport apparatus of the present invention is illustrated. Whereas the embodiment of the transport apparatus illustrated in FIG. 1 is particularly adapted for distributing tube support members having two types of yarn packages (e.g., those with a successfully prepared yarn end and those without a successfully prepared yarn end), the embodiment of the transport apparatus illustrated in FIG. 2 is particularly adapted for controlled transport of tube support members which support tubes having partial windings thereon in a waiting area for subsequent delivery to a tube stripping device for stripping of the partial windings. The tube stripping device is part of a post winding tube handling assembly which handles various types of tubes after the tubes have exited the winding stations of a textile winding machine and tubes or yarn packages transported along the bypass route 24. A discharge transport device 28 includes a belt 29 extending adjacent the downstream ends of the station feed paths of a textile winding machine (not shown) for receiving all of the tube support members which have traveled through the winding stations along the station feed paths. Additionally, the belt 29 transports those tube support members which have been supplied to it from, for example, an arrangement such as the bypass route 24 described with respect to FIG. 1 which bypasses yarn packages not having a successfully prepared yarn end past the winding stations to the post winding tube handling assembly.

The discharge belt 29 is trained around a conventional guide roller (not shown) and a drive roller 29', which is operatively connected to a drive motor 30 for driving operation of the discharge belt. The discharge belt is flanked on both lateral sides thereof by guide contours 31 which maintain the tube support members 1 centrally on the discharge belt 29 and, additionally, guide the tube support members along predetermined paths at various tube handling locations. For example, the guide contours 31 cooperate with an electromagnetic retaining element 33 and a stop element 34 of a remaining yarn detector 32 to individually position each tube support member 1 at a detecting position in which a remaining yarn sensor determines whether the tube supported on the respective tube support member has any remaining windings of yarn thereon. The guide contours 31 guide the tube support members 1 toward their respective lateral side of the discharge belt 29 on which the remaining yarn detector 31 is positioned and thereby guide the base component 2 of the respective tube support member into engagement with the stop element 34. In correspondence with the guided positioning of the tube support member, the electromagnetic retaining element 33 is actuated to magnetically interact with a ferromagnetic ring extending about the circumference of the base component 2 of the tube support member to thereby retain the tube support member in position for detecting of the tubes supported thereon while the discharge belt 29 continues to move relatively under the tube support member. Once the remaining yarn detector 32 has performed its detecting operation, the electromagnetic retaining element 33 is deactivated to cease its magnetic interaction with the ferromagnetic band on the base component 2 of the tube support member 1, whereupon the discharge belt 29 again transports the tube support member in a downstream direction.

If the remaining yarn detector 32 determines that no remaining yarn is present on the tube, the respective tube support member supporting the tube is thereafter transported to the end of the discharge belt 29 for appropriate further handling such as, for example, removal of the tube by a conventional tube remover device (not shown). On the other hand, if the remaining yarn detector 32 has detected the presence of remaining yarn on a tube, the post-winding tube handling assembly performs a number of steps to distribute the tube support member 1 to an appropriate handling location. To this end, the post-winding tube handling assembly includes a branch belt 38 trained, at its upstream end, around a drive roller operatively connected to a drive motor 40 for driving operation of the belt. The upstream end of the branch belt 38 is positioned adjacent the discharge belt 29 downstream of the remaining yarn detector 32 and an electromagnetic guide element 35 is disposed relative to the junction of the tube belts for selective guiding of tube support members from the discharge belt 29 onto the branch belt 38.

The branch belt 38 is flanked on one lateral side thereof by a guide contour 39 which cooperates with a pair of guide contours 37,40 extending over the other lateral side of the branch belt to centrally maintain the tube support members on the branch belt 38. A tube stripping delivery belt 42 has its upstream end disposed adjacent the branch belt 38 and trained around a guide roller 42". The downstream end of the tube stripping delivery belt 42 is trained around a drive roller 42', which is operatively connected to a drive motor 43 for driving operation of the belt. An electromagnetic guide element 36 is disposed relative to the junction of the branch belt 38 and the tube stripping delivery belt 42 for guiding tube support members from the branch belt onto the tube stripping delivery belt.

A return belt 50 extends transversely to the tube stripping delivery belt 42 with its upper run disposed intermediate the upper and lower runs of the tube stripping delivery belt. The downstream end of the return belt 50 is disposed adjacent the discharge belt 29 at a location upstream of the remaining yarn detector 32 and is trained around a drive roller 50', which is operatively connected to a drive motor 56 for driving operation of the return belt. An electromagnetic guide element 48 is positioned relative to the junction of the tube stripping delivery belt 42 and the return belt 50 for guiding tube support members from the tube stripping delivery belt 42 onto the return belt 50 as the tube support members being transported on the tube stripping delivery belt approach the return belt 50. Another electromagnetic guide element 54 is disposed relative to the junction of the two belts for guiding tube support members 1 from the portion of the tube stripping delivery belt 42 downstream of the return belt 50 onto the return belt. Additionally, a sensor 55 is disposed relative to the downstream portion 53 of the tube stripping delivery belt 42 for sensing the presence of a tube support member in a predetermined position on a downstream portion 53, as will be described in more detail below.

The return belt 50 extends from another location (not shown) at which yarn packages are specially handling such as, for example, by mechanical working of the yarn package, to effect loosening of a yarn end therefrom. The downstream end of the branch belt 38 extends to this other location for delivering tube support members thereto. The return belt 50 is flanked along one lateral side thereof by a guide contour 52 and along an opposite lateral side thereof by a guide contour 49.

A conventional tube stripping device 47, which is only schematically illustrated, is disposed adjacent the tube stripping delivery belt 42 intermediate the upstream end of the belt and its junction with the return belt 50 for stripping yarn from a tube supported on a tube support member. The tube support members are delivered by the tube stripping delivery belt 42 to the tube stripping device 47 along a guided path formed by an upper guide contour 45 and a lower guide contour 46 both extending along the same respective lateral side of the tube stripping delivery belt and an upper guide contour 41 and a lower guide contour both extending along the other lateral side of the tube stripping delivery belt. The upper guide contour 41 includes a stop guide 44 for engaging a tube support member 1 to prevent upstream movement of the engaged tube support member in an upstream direction from the drive roller 42' toward the guide roller 42" of the tube stripping delivery belt 42, as will be described in more detail below.

If the tube stripping device 47 has successfully stripped all remaining yarn from a tube positioned at the tube stripping location, a sensor (not shown) associated with the tube stripping device detects that the tube is now empty and, in response to such detection, the electromagnetic guide element 48 is activated to guide the respective tube support members supporting the tube from the tube stripping delivery belt 42 onto the return belt 50. The tube support member 1, which now supports an empty tube, is then returned by the return belt 50 to the discharge belt 29. On the other hand, if the sensor associated with the tube stripping device 47 senses that some yarn still remains on a tube after a tube stripping operation, the respective tube support member 1 supporting the tube is transported from the tube stripping location to the downstream portion 53 by the tube stripping delivery belt 42. Those tubes supported in the downstream portion 53 are then handled, for example, in a manual operation by an operator to remove the remaining yarn.

With further reference to the operation of the postwinding tube handling assembly, those tube support members 1 which support tubes detected as having some remaining windings of yarn are guided from the discharge belt 29 onto the branch belt 38 by controlled actuation of the electromagnetic guide element 35 in response to the detection of remaining yarn by the remaining yarn detector 32. The branch belt 38 transports these tube support members toward the junction of the branch belt and the tube stripping delivery belt 42 and, if the remaining yarn detector 32 has determined that the tube supported on the respective tube support member 1 does not have a sufficient amount of yarn to warrant return of the tube to a winding station for further winding, the electromagnetic guide element 36 is actuated to guide the tube support member from the branch belt 38 onto the tube stripping delivery belt 42. On the other hand, if the tube on the respective tube support member 1 comprised a sufficient amount of yarn to justify re-circulation to a winding station for a further attempt at unwinding the yarn from the tube, the tube support member is not diverted from the branch belt 38 but, instead, is further transported to the location at which the special handling device mechanically works or otherwise handles the yarn on the tube to loosen its yarn end.

Those tube support members 1 diverted onto the tube stripping delivery belt 42 are transported to a tube stripping position at which the tube stripping device 47 acts on the tube supported on the tube support member to strip the remaining yarn therefrom. As the tube stripping device 47 may operate at a fixed cyclic rate, there may be some periods of time during which a number of tube support members are supported on the tube stripping delivery belt 42 awaiting further transport to the tube stripping position.

After the tube on each tube support member has been completely stripped of remaining yarn by the tube stripping device 47, the tube support member is further transported by the tube stripping delivery belt across the return belt 50 to the downstream portion 53 of the tube stripping delivery belt. A stop 57 prevents the tube support members in the downstream portion 53 from being transported beyond the downstream end of the tube stripping delivery belt 42. Once a predetermined number of such tube support members 1 have been transported into the downstream portion 53, the sensor 55 detects the presence of a tube support member on the tube stripping delivery belt 42 at a location adjacent the sensor and a signal is provided to alert an operator. Also, in response to this sensing, a control unit (not shown) arranges for the return of those tube support members 1 in the downstream portion 53 to the discharge belt 29. Specifically, the control unit controls the tube stripping delivery belt 42 to operate in a reverse direction to thereby transport the tube support members 1 out of the downstream portion 53. As these tube support members 1 approach the junction of the tube stripping delivery belt 42 and the return belt 50, the electromagnetic guide element 54 is actuated to guide the tube support members onto the return belt 50 for further transport thereby to the discharge belt 29.

During this reverse movement of the tube stripping delivery belt 42, those tube support members which are supported on the tube stripping delivery belt awaiting transport thereby into the tube stripping position are moved in an upstream direction toward the branch belt 38. To prevent such tube support members from being moved onto the branch belt 38 (which would result in the mixing of these tube support members with tube support members supporting tubes being transported to this special handling device), the transport apparatus of the present invention, by the cooperative arrangement of the upper guide contours 41,45 and the lower guide contour 46 with the stop guide 44, insures that a tube support member is moved into engagement with the stop guide 44 to prevent further upstream movement of that tube support member as well as the subsequently following tube support members. The lower guide contour 46, in cooperation with the lower guide contour on the other lateral side of the tube stripping delivery belt 42, engages the base component 2 of the tube support member 1 to be engaged by the stop guide 44 to direct the tube support member 1 toward the stop guide 44. As the stop guide 44 extends laterally into the path of movement of the tube support member 1, the stop guide engages the collar component 3 of the tube support member and prevents further upstream movement of the tube support member 1 while the tube stripping delivery belt 42 continues to move relatively under the tube support member 1.

Figure 3:
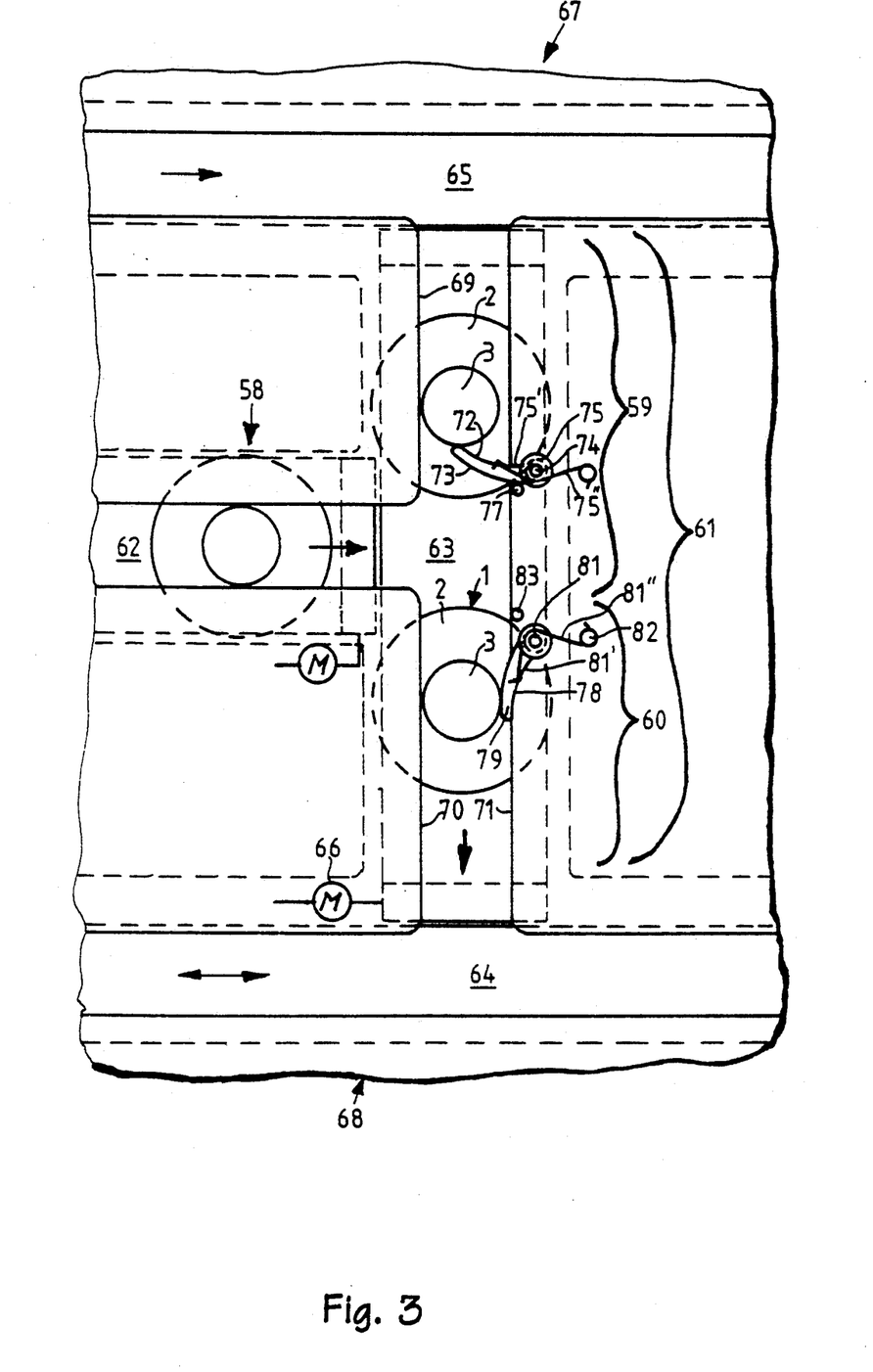
FIG. 3 is a top plan view of a further embodiment of the transport apparatus particularly adapted for selectively transporting individual tube support members to one of a pair of transport assemblies.

In FIG. 3, a further embodiment of the transport apparatus of the present invention is illustrated. In this embodiment, the transport apparatus is particularly adapted for distributing tube support members to a selected one of a pair of belts 64,65 which may be, for example, a supply belt and a bypass belt in the same manner as discussed with respect to the embodiment illustrated in FIG. 1. For example, the belt 64 can be a supply belt of a supply route 68 for supplying tube support members having yarn packages thereon to the winding stations of a winding machine and the belt 65 can be a bypass belt of a bypass route 67 for transporting tube support members having yarn packages without a successfully prepared yarn end to a bypass location. An inlet feed path 58 includes a belt 62 for delivering tube support members 1 to the transport apparatus for distribution thereby to a respective one of the belts 64,65.

A transverse belt 63 extends between the belt 64,65 and is trained around a conventional guide roller and a drive roller, which is operatively connected to a drive motor 66 for driving operation of the belt. A guide plate 61 includes a bypass portion 59 extending along one lateral side of the transverse belt 63 and a supply portion 60 also extending along the same lateral side of the transverse belt 63 adjacent the bypass portion 59. The bypass portion 59 and the supply portion 60 share a common upper guide contour 71 which extends laterally inwardly of the transverse belt 63 at a height above the base component 2 of the tube support members 1. The bypass portion 59 and the supply portion 60 also each include a lower guide contour for engaging the base component 2 of the tube support members 1 on the transverse belt 63. A guide contour 69 is disposed laterally opposite the bypass portion 59 for engaging the collar components 3 of the tube support members 1 being transported along a bypass delivery path of the transverse belt 63. A guide contour 70 is disposed laterally opposite the supply portion 60 for engaging the collar components 3 of the tube support members 1 being transported in a supply delivery path of the transverse belt 63.

In lieu of the fixed position stop guides 11,14 of the embodiment of the transport apparatus illustrated in FIG. 1, the embodiment of the transport apparatus illustrated in FIG. 3 includes a movable bypass stop guide 72 and a movable supply stop guide 79, each for preventing upstream movement of tube support members 1 in the respective bypass or supply delivery path during reverse movement of the transverse belt 63. The bypass stop guide 72 includes a swing arm 73 pivotably mounted to the bypass portion 59 of the guide plate 61 by a pivot 74. The arm 73 is pivotable into the bypass delivery path to engage the collar component 3 of a tube support member 1 in the bypass delivery path. A stop 77 extends from the guide plate 61 for limiting the pivoting movement of the arm 73. A spring 75 has a coiled portion 75' through which the pivot 74 extends and has one end 75 secured to the arm 73 and another end 75" secured to the guide plate 61.

The spring 75 normally biases the arm 73 to pivot outwardly in a laterally extending position in which the backside of the arm engages the stop 77 and the arm extends laterally across the bypass delivery path for engaging the collar component 3 of a tube support member 1.

The supply stop guide 79 includes an arm 78 pivotably connected by a pivot 81 to the supply portion 60 of the guide plate 61.

A spring 81' includes a coiled center portion through which the pivot 81 extends and one end 81 of the spring is attached to the arm 79. Another end 82 of the spring is mounted to the guide plate 61. The arm 79 is pivotably against the bias of the spring 81' into an extending position in which it extends laterally relative to the transverse belt 63 for engaging the collar component 3 of a tube support member 1 in the supply delivery path. The spring 81' automatically returns the arm 79 to an extending position in which the arm is extended into the supply delivery path. The spring 81' normally biases the arm 79 into a pivoting extending position in which the backside of the arm is in engagement with the stop 83 and the arm extends laterally into the supply delivery path for engaging the collar component 3 of a tube support member 1.

In operation, the tube support members 1 are transferred from the belt 62 onto the transverse belt 63 and the transverse belt 63 is driven in a selected forward or reverse direction to deliver the tube support member to a respective one of the belts 64,65. If a tube support member 1 is to be delivered to the belt 64, the transverse belt 63 is driven in a direction by which the tube support member 1 moves along the supply delivery path and, as the tube support member path travels adjacent the bypass stop guide 78, the collar component of the tube support member contacts the backside of the arm 79 to move the arm against the bias of the spring 81'. Once the collar component 3 clears the arm 79, the arm is returned to its normal extending position.

However, if the tube support member 1 has not yet been transferred to the belt 64 and is still supported on the transverse belt 63 and, further, if the direction of movement of the transverse belt 63 has been reversed to transport a subsequently following tube support member to the belt 65.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A textile machine transport apparatus for transporting tube support members of the type on which yarn packages are supported comprising:

means for advancing tube support members, the advancing means being drivable in a forward direction to advance tube support members in a downstream direction along a delivery path and reversibly drivable in a reverse direction substantially opposite to the forward direction; and means extending laterally from one lateral side of the delivery path toward the other lateral side of the delivery path for engaging a tube support member to prevent upstream movement of the engaged tube support member along the delivery path, said laterally extending means including a contoured surface formed therein and configured to interrupt travel of tube support members traveling in one direction while allowing tube support members traveling in the opposite direction to pass therepast.

2. A textile machine transport apparatus according to claim 1 wherein the laterally extending means extends from one lateral side of the delivery path toward the other lateral side of the delivery path and further comprising means for guiding tube support members during downstream movement thereof along the delivery path toward the one lateral side of the delivery path to position the tube support member sufficiently toward the one lateral side of the delivery path to ensure movement of the tube support member into engagement with the laterally extending means upon subsequent driving movement of the advancing means in the reverse direction.

3. A textile machine transport apparatus according to claim 2 wherein the guiding means includes a guide contour extending in the downstream direction at an angle from the other lateral side of the delivery path toward the one lateral side of the delivery path.

4. A textile machine transport apparatus according to claim 1 and further comprising an inlet feed means for supplying tube support members to the advancing means, a first outlet means to which the advancing means advances tube support members through driving movement of the advancing means in the forward direction, and a second outlet means to which the advancing means advances tube support members through driving movement of the advancing means in the reverse direction and the laterally extending means includes a first portion for engaging a tube support member to prevent upstream movement of the engaged tube support member away from the first outlet means during movement of the advancing means in the reverse direction and a second portion for engaging a tube support member to prevent upstream movement of the engaged tube support member away from the second outlet means during movement of the advancing means in the forward direction.

5. A textile machine transport apparatus according to claim 4 wherein the first and second portions of the laterally extending means each include a guide contour extending in the path of the respective tube support member being advanced at an angle from one lateral side of the path toward another lateral side of the path for positioning a tube support member sufficiently toward the other lateral side of the delivery path to insure movement of the tube support member into engagement with the respective portion upon subsequent driving movement of the advancing means in a direction which effects upstream movement of the engaged tube support member.

6. A textile machine transport apparatus according to claim 5 wherein each tube support member comprises an annular based component, a collar component coaxially mounted on the base component, and a post component onto which a yarn package is inserted and each of the first and second portions of the laterally extending means is disposed for engaging the collar component of a tube support member.

7. A textile machine transport apparatus for transporting tube support members of the type on which yarn packages are supported comprising:

means for advancing tube support members, the advancing means being drivable in a forward direction to advance tube support members in a downstream direction along a delivery path and reversibly drivable in a reverse direction substantially opposite to the forward direction;

means extending laterally from one lateral side of the delivery path toward the other lateral side of the delivery path for engaging a tube support member to prevent upstream movement of the engaged tube support member along the delivery path; and means for guiding tube support members during downstream movement therof along the delivery path toward one lateral side of the delivery path to position the tube support member sufficiently toward the one lateral side of the delivery path to ensure movement of the tube support member into engagement with the laterally extending means upon subsequent driving movement of the advancing means int he reverse direction.

8. A textile machine transport apparatus according to claim 7 wherein the guiding means includes a guide contour extending int he downstream direction at an angle from the other lateral side of the delivery path toward the one lateral side of the delivery path.

9. A textile machine transport apparatus according to claim 7 and further comprising an inlet feed means for supplying tube support members to the advancing means, a first outlet means to which the advancing means advances tube support members through driving movement of the advancing means int he forward direction, and a second outlet means to which the advancing means advances tube support members through driving movement of the advancing means in the reverse direction and the laterally extending means includes a first portion for engaging a tube support member to prevent upstream movement of the engaged tube support member away from the first outlet means during movement of the advancing means in the reverse direction and a second portion for engaging a tube support member to prevent upstream movement of the engaged tube support member away from the second outlet means during movement of the advancing means in the forward direction.

10. A textile machine transport apparatus according to claim 7 wherein the first and second portion of the laterally extending means each include a guide contour extending in the path of the respective tube support member being advanced at an angle from one lateral side of the path toward another lateral side of the path for positioning a tube support member sufficiently toward the other lateral side of the delivery path to insure movement of the tube support member into engagement with the respective portion upon subsequent driving movement of the advancing means in a direction which effects upstream movement of the engaged tube support member.

11. A textile machine transport apparatus according to claim 7 wherein each tube support member comprises an annular based component, a collar component coaxially mounted on the base component, and a post component onto which a yarn package is inserted and each of the first and second portions of the laterally extending means is disposed for engaging the collar component of a tube support member.

* * * * *